United States Patent Office 3,328,134
Patented June 27, 1967

3,328,134
PROCESS FOR PREPARING POLY-
HYDROPOLYBORATES
Henry C. Miller and Earl L. Muetterties, Wilmington,
Del., assignors to E. I. du Pont de Nemours and Company, Wilmington, Del., a corporation of Delaware
No Drawing. Filed Dec. 28, 1964, Ser. No. 421,697
13 Claims. (Cl. 23—358)

This invention relates to new methods for making polyhydropolyborates, and is a continuation-in-part of our U.S. application Ser. No. 38,099 and now abandoned filed June 23, 1960 which was a continuation-in-part of our U.S. application Ser. No. 15,042 filed Mar. 15, 1960 and now abandoned.

Compounds of boron and hydrogen whose properties are described in the literature are primarily limited to products having at most 10 boron atoms. Such products include the covalent hydrides $B_2H_6$, $B_5H_9$, $B_5H_{11}$ and $B_{10}H_{14}$; and salts of the boro-hydride anions $BH_4^-$, $B_2H_7^-$, $B_3H_8^-$, $B_{10}H_{13}^-$ and $B_{10}H_{14}^=$. The salts decompose in acid solution and acids having the above borohydride anions are unknown. The study of higher polyhydropolyborates has been handicapped by lack of a suitable broad and versatile method for preparing them.

Correspondingly, it is an object of this invention to provide a general method for preparing a wide range of polyhydropolyborates from readily available raw materials. This and other objects will become apparent hereinafter.

The initial process of this invention comprises reacting an alkali metal or an alkaline earth metal hydroborate with diborane under superatmospheric pressure to obtain polyhydropolyborates which have at least three boron atoms and which can (and frequently do) have a much higher number of boron atoms. The metal hydroborate employed in the process, also referred to as a metal borohydride or a metal tetrahydroborate, is represented by the general formula (1)  $M'(BH_4)_x$ where M′ is an alkali metal or alkaline earth metal, and $x$ is the valence of M′, i.e., $x$ is 1 or 2. Diborane, employed as the second reactant in the process is represented by the formula $B_2H_6$.

The polyhydropolyborates which are obtained directly by the process are represented generically by the formula (2)  $M'_a(B_nH_m)_{b'}$ wherein M′ is selected from the group consisting of alkali metals and alkaline earth metals, $(B_nH_m)$ is an anion having a valence of less than 3, i.e. 1 or 2 inclusive, $a'$ and $b'$ are positive integers of 1 through 2 whose values are determined by the valence of M′ and $(B_nH_m)$, $n$ is an integer of at least 3, $m$ is an integer greater than 3 and is at least equal to $n$, and the sum of $m$, $n$, and the valence of $(B_nH_m)$ is a positive even number.

The valence of M′ can be 1 or 2 and the value of $n$ can range from 3 through 12 or even higher. The relationship between $a'$ and $b'$ is more particularly expressed by the equation

$$b' = \frac{a' \times \text{valence of M}'}{\text{valence of B}_nH_m}$$

The value of $m$ is at least 4 and it can be equal to or greater than $n$ but never less than $n$.

The composition of the polyhydropolyborates obtained in the process of this invention can be controlled by conditions under which the reaction is conducted so as to fix the atomic ratio of boron to hydrogen. It is a valuable feature of the process that the composition of the reaction products can be controlled by simple variations in conditions of operation.

The process of reacting an alkali metal or alkaline earth metal hydroborate with diborane has an additional valuable feature, i.e., it permits the preparation of polyhydro polyborates of high boron content. These polyhydropoly borates contain more than 10 boron atoms and they represent a particular group falling within the scope of Formula 2. These reaction products of high boron content are represented by the formula (3)  $M'_{a'}(B_{n'}H_{m'})_{b'}$ where M′, $a'$ and $b'$ are as defined previously, $n'$ is a whole number of more than 10 and preferably does not exceed 12, $m'$ is at least equal to $n'$ and does not exceed 14, $(B_{n'}H_{m'})$ is an anion whose valence is 1–2, and the sum of $n'$, $m'$, and the valence of $(B_{n'}H_{m'})$ is a positive even number.

A class of polyhydropolyborates for whose preparation the process is particularly adaptable are polyhedral polyhydropolyborates having a divalent anion consisting of 12 boron atoms and 12 hydrogen atoms, i.e., compounds which are represented by the formula (4)  $M'_a(B_{12}H_{12})$ where M′ is as defined above and $a$ has a value of 1 or 2 which is determined by the valence of M′. The compounds of Formula 4 can undergo a wide range of metathetical cation exchange reactions which form a part of this invention to obtain compounds having a broad range of cations. Thus, the compounds of Formula 4 provide a versatile source of many dodecahydrododecaborates of the generic formula (5)  $M_a(B_{12}H_{12})_b$ wherein M is a cation of total atomic weight of at least 5, having a valence of 1 through 4, i.e., 1, 2, 3 or 4; and $a$ and $b$ are positive whole numbers of 1 through 3 whose respective values are determined by the valence of M according to the formula

$$b = \frac{a \times \text{valence of M}}{2}$$

The term "cation," used throughout, has reference to an atom or group of atoms which form a positively charged ion in aqueous solution. The term "anion," used throughout, refers to a group which forms a negatively charged ion in aqueous solution.

A second class of polyhydropolyborates within the scope of Formula 3 which are obtained by the initial process are alkali metal and alkaline earth metal polyhydropolyborates of the formula (6)  $M'(_{11}H_{14})_x$ wherein M′ and $x$ are as previously defined. Other classes of polyhydropolyborates obtained in the initial reaction include the alkali metal and alkaline earth metal salts of the polyhydropolyborate anion $B_3H_8^-$.

The reactants used in the initial process of preparing the products represented by Formula 2 are commercially available. Any alkali metal or alkaline earth metal hydroborate (also called tetrahydroborate) can be used, but sodium and potassium hydroborates are the most readily available salts and they, therefore, form a preferred group.

Alkali metals and alkaline earth metals are, of course, elements of atomic numbers 3–56, inclusive, of Groups I-A and II-A of the Periodic Table. M′ in Formulas 1 through 4 and 6 can be, for example, lithium, sodium, potassium, rubidium, cesium, beryllium, magnesium, calcium, strontium, and barium. When M′ is an alkali metal, $x$ has a value of 1; and when M′ is an alkaline earth metal, $x$ has a value of 2.

In general, commercial grade materials are satisfactory for use in these processes without special purification. It is, of course, preferable that the reactants be free of adventitious moisture which, if present, may lower the yield of desired product.

The reaction is conducted by maintaining the reactants in contact under superatmospheric pressure in the substantial absence of air and moisture and at the desired temperature until an appreciable amount of polyhydropolyborate has been formed. As a matter of convenience, the reaction is frequently conducted under autogenous pressure in a suitable pressure vessel. In this mode of operation, a pressure vessel is employed which is lined with a corrosion-resistant material, e.g., commercially available stainless steels, platinum or silver. The pressure vessel is preferably flushed with an inert gas to remove traces of moisture and it is then charged with an alkali or alkaline earth metal hydroborate and, optionally, with a solvent. The vessel is closed and cooled to a low temperature with, e.g., liquid nitrogen, solutions of solid carbon dioxide, and the like. The vessel is connected to a vacuum pump and the internal pressure is reduced to a value sufficiently low, e.g., 1 mm. or less (as low as 0.001 mm.), to permit the desired quantity of diborane to be pressured into the reaction vessel. The reaction mixture is held at 0° C. or higher for the period necessary to effect reaction. The mixture is preferably agitated by any suitable means during the heating period.

The molar ratio in which the reactants are used is not critical. It is preferable to use at least as much diborane as alkali or alkaline earth metal hydroborate, i.e., the molar ratio of $B_2H_6/M'(BH_4)_x$ is preferably at least 1. To obtain high yields of polyhydropolyborates having more than 10 boron atoms which fall within the scope of Formula 3, it is desirable to use diborane in considerable excess, i.e., the molar ratio $B_2H_6/M'(BH_4)_x$ is preferably 2 or 3 or even higher. It is not necessary, however, to use these ratios to obtain at least some quantity of the desired polyhydropolyborates.

A convenient temperature of operation will generally be between about 0° and 200° C., although lower or higher temperatures can be employed. The boron content of the product which is obtained in the process is influenced by the temperature at which the reaction is conducted. Up to about 100° C. the principal product is an octahydrotriborate (1−), i.e., $M'(B_3H_8)_x$. The preferred temperature range for obtaining this type of product is about 20–80° C. At 100° C., or higher, the principal products are polyhydropolyborates having more than 10 boron atoms, i.e., the product has the formula $$M'_a(B_nH_{m'})_{b'}$$

referred to as (3) in an earlier paragraph.

Heating of the reactants may be accomplished by any suitable means. The temperature may be raised by a stepwise procedure or the desired temperature may be reached by a one-step process.

It is essential that the reaction be conducted at a pressure higher than atmospheric. Accurate control of the pressure is not necessary and autogenous pressure obtained in the reaction chamber is normally used. The pressure may lie between about 3–500 atmospheres (absolute) or even higher. It is preferable that the reaction be conducted at a pressure of 5 atmospheres (absolute) or higher.

Mixing of the reactants during the process is desirable although not essential. Mixing can be accomplished by any suitable means, e.g., by mechanical stirring, shaking or tumbling of the entire reactor.

The time of the reaction is not critical. In a batch process, the time will generally lie between about 1 hour and 50 hours. In general, a reaction time of 5 hours to 25 hours is sufficient for batch operation. For a continuous process, which can also be employed, shorter reaction times are used and unreacted components can be recirculated.

In a preferred form of these processes, the reaction between diborane and the alkali metal or alkaline earth metal hydroborate is conducted in the presence of an inert solvent, i.e., a liquid which is not decomposed under the conditions of the reaction by the components of the process or by the products which are obtained. Ethers, thioethers (i.e., sulfides), tertiary amines, trisubstituted phosphines and hydrocarbons can be used in the process. The solvents preferably are liquids at the operating temperature and, in most cases, are liquids at prevailing atmospheric temperatures. Examples of operable solvents are diethyl ether, 1,2-dimethoxyethane (glyme), 1,2-diethoxyethane, benzene, hexane, triethylamine, tributylamine, dimethyl sulfide, dibutyl sulfide, triethylphosphine, tributylphosphine, and the like. Ethers and tertiary amines are preferred solvents. Relatively high boiling ethers such as glyme are especially preferred.

In working up the reaction products, the volatile reaction products are generally removed by venting the vessel to the atmosphere. Hydrogen is a by-product of the reaction and it is removed with the volatile products. Suitable precautions should be observed in venting the reaction vessel in view of the flammability, toxic or, possibly, explosive hazards of the volatile products.

The reaction products, left after venting, are generally liquids or solids. For processes conducted at less than about 100° C. the products are isolated by conventional procedures as illustrated in Example I. For processes conducted at 100° C. or higher, advantage is taken of the differences in solubility of the polyhydropolyborates in glyme to effect separation of the reaction products. For example, $NaB_{11}H_{14}$ is very highly soluble in 1,2-dimethoxyethane (glyme). This solubility is in sharp contrast to the solubility of $Na_2B_{12}H_{12}$, and permits the separation of the two classes of polyhydropolyborates.

In general, both the $B_{12}H_{12}^=$ and the $B_{11}H_{14}^-$ compounds obtained in the process are solid compounds which are salt-like in character. Many of the compounds dissolve in water or hydroxylated solvents, and, as obtained, frequently contain water or solvent of crystallization. Solvents of crystallization are readily removed by conventional procedures, e.g., recrystallization, heating under reduced pressure, and the like.

The majority of the compounds are white crystalline materials which are generally stable at normal atmospheric temperatures and pressures.

The $B_{12}H_{12}^{2-}$ containing compounds which are produced by the process, have characterizing absorption bands in the infrared absorption spectrum which serve to identify the anion. These characterizing absorption bands appear at $4.0\mu \pm 0.1$ and $9.35\mu \pm 0.1$. The presence of these bands, considered in combination with the elemental analysis of the compounds, confirms that the products are dodecahydrododecaborates. These polyhydropolyborates are further characterized by the X-ray diffraction structure for the cesium salt, i.e., $Cs_2B_{12}H_{12}$. This salt forms face-centered cubic crystals which have the following characteristic values: $a_0 = 11.28$ A.; $Z=4$; $d_4^{25} = 1.896$; a unit cell weight of 1639.2; and a formula weight of 409.8. The dodecahydrododecaborate anion is still further characterized by the very low solubility of its sodium salt, i.e., $Na_2B_{12}H_{12}$, in 1,2-dimethoxyethane (glyme).

The salts of the $B_{11}H_{14}^-$ anion have identifying characteristics described fully as follows:

*Infrared absorption spectrum.*—Strong absorption at $3.95\mu \pm 0.1$, medium absorption at $9.65\mu \pm 0.1$, and $9.9\mu \pm 0.1$, and broad absorption at $13.85\mu \pm 0.1$.

*Ultraviolet absorption spectrum.*—Substantially no absorption, i.e., the alkali metal and alkaline earth metal salts are substantially transparent. Weak absorption bands, due principally to traces of impurities, are shown at the following values: $k$ at 2750 A.=1.84; $k$ at 2770 A.=3.78. The alkali metal and alkaline earth metal salts are also transparent to visible light.

*Nuclear magnetic resonance spectrum.*—The spectrum is calibrated at 10 megacycles relative to the boron resonance of $B(OCH_3)_3$, using side band technique [see, for example, J. T. Arnold and M. E. Packard, J. Chem. Phys. 19, 1608 (1951)]: $J_{B-H}$, 139 c.p.s. (a doublet); shift from $(CH_3O)_3B$, 356±10 c.p.s. These data are determined for the $B^{11}$ isotope in the compound.

*X-ray powder diffraction data for cesium salt.*—The data as follows, where the letter represents a measure of intensity (S, strong; $M_1$–$M_4$, medium in decreasing value): 7.36, $M_4$; 5.64, $M_2$ 5.57, $M_2$; 5.16, $M_4$; 4.84, $M_3$; 4.47, $M_1$; 4.22, S; 3.66, $M_2$; 3.37, $M_4$; 2.78, $M_4$; 2.57, $M_2$. From these data, the space group and unit cell dimensions are interpreted as follows: orthorhombic, space group, $D^{11}_{2h}$-$P2/b2_1/c2_1/c$; $Z=4$, four formula weights per unit cell; $a_0=7.35$; $b_0=11.28$; $c_0=12.85$; formula molecular weight, 266; density of single crystal of cesium salt, $d_4^{25}=1.6240$.

*Differential thermal analysis.*—The cesium salt, $$CsB_{11}H_{14}$$

shows a strong irreversible exothermic transition at about 212° C.

In the above discussion, the characteristics given for infrared and ultraviolet spectra are pertinent for the $B_{11}H_{14}^-$ anion. Other characteristic bands or absorption coefficients can be present and these are determined by the cation, M, which will be present in the salt.

In the compounds obtained directly in the process, as defined in Formula 3, the cation M′ is an alkali or alkaline earth metal which is also transparent to visible and ultraviolet light. Salts of these metals are well adapted to ultraviolet absorption studies.

In the X-ray diffraction studies and thermal differential analyses, the characteristics are determined by all the components of the crystals and the individual contributions of the cation M and the $B_{11}H_{14}^-$ anion cannot be separated. For this reason, the characteristic X-ray diffraction pattern and a thermal differential analysis are given for a single salt, in this case, the cesium salt which is readily obtained from other salts by processes illustrated fully in the examples.

The alkali metal and alkaline earth metal salts of the $B_{12}H_{12}^{2-}$ anion can undergo a wide range of metathetical cation-exchange reactions to obtain compounds having a broad range of cations, as described by Formula 5. The cations (M) which can replace the alkali metal or alkaline earth metal in the dodecahydrododecaborates include other metals. These other metals are defined according to the Periodic Table in Deming's "General Chemistry," 5th Ed., Chap. 11, John Wiley and Sons, Inc., and in Lange's "Handbook of Chemistry," 9th Ed., pages 56–57, Handbook Publishers, Inc. (1956) and are the elements of Groups I–B, II–B, III–B, IV–B, V–B, VI–B, VI–A and VIII and the elements of Groups III–A, IV–A, V–A and VI–A which have atomic numbers above 5, 14, 33 and 52 respectively.

Preferred metal cations making up M in Formula 5 are derived from the elements of Groups I–B and II–B having an atomic number of up to and including 80.

The cation, M, may also be a cation derived, directly or indirectly, from nitrogen containing compounds, e.g., ammonia, amines, hydrazines, aryldiazonium bases and the like. Examples of N-substituted ammonium radicals include those having the formulas $RNH_3^+$, $R_2NH_2^+$, $R_3NH^+$, $R_4N^+$, $ArN=N^+$, and the like wherein R represents an organic group bonded to nitrogen. The R groups are not critical features of these cation groups; thus, R can be an open-chain, closed-chain, saturated or unsaturated hydrocarbon or substituted hydrocarbon group, or R can be a heterocyclic ring of which the nitrogen atom is a component part, such as pyridine, quinoline, morpholine, hexamethylenimine, and the like. Preferably, R, for reasons of availability of reactants, contains not more than 18 carbon atoms and is alkyl. R can be, for example, methyl, 2-ethylhexyl, octadecyl, allyl, cyclohexyl, cyclohexenyl, phenyl, naphthyl, anthryl, cyclohexyphenyl, diphenylyl, benzyl, chloroethyl, ω-cyanoamyl β-hydroxyethyl, p-hydroxyphenyl, and the like. The ary group in the aryldiazonium cation preferably contains at most 18 carbons, e.g., a terphenyldiazonium group. Ar refers to an aryl group.

Examples of N-substituted hydrazonium radicals include those wherein R has the same significance as indicated in the preceding paragraph. To illustrate, the hydrazonium cation can be derived from phenylhydrazine, methylhydrazine, 1,1-dimethylhydrazine, 1,2-dimethylhydrazine, ethylhydrazine, 1,1 - diethylhydrazine, and similar compounds. Examples of aryldiazonium radicals include phenyldiazonium, tolyldiazonium, p-ethoxyphenyldiazonium, and the like.

Thus, the atomic weights of nitrogen bases from which cations are derived can range from a low value of about 17 for ammonia ($NH_3$) to a value as high as about 800 or even higher for long chain substituted amines, e.g., trioctadecylamine. Polynitrogen cations are included, such as those derived from diamines (for example, hexamethylenediamine, p-phenylenediamine or piperidine), triamines (for example, diethylenetriamine), tetramines (for example, triethylenetetramine), and the like.

The cation, M, can be a complex cation such as metal-ammine groups, e.g., $(NH_3)_cY$, where Y is cobalt, nickel, copper, zinc, cadmium, mercury or silver and $c$ is a positive number of at most 6.

The cation, M, can be less commonly known groups than those mentioned heretofore. It can be, for example, substituted phosphonium ($R_4P^+$), substituted polyphosphonium, ($R_3P^+R'P^+R_3$), substituted sulfonium ($R_3S^+$), and the like, where R has the meaning described in the previous paragraphs and R′ is a divalent hydrocarbon group which, preferably, has at most 6 carbons.

The cation exchange processes by which the alkali metal or alkaline earth metal dodecahydrododecaborates are converted to the above-described metal salts comprise a part of this invention.

In one procedure the alkali metal and alkaline earth metal dodecahydrododecaborates undergo simple metathetic reactions with other salts to effect an exchange of cations. Thus, sodium dodecahydrododecaborate can be reacted in aqueous or non-aqueous media with metal cation precursors such as rubidium chloride, strontium chloride, tantalum chloride, chromium sulfate, manganous acetate, cupric chloride, cuprous chloride, zinc bromide, cadmium chloride, aluminum chloride( hydrated), stannic chloride( hydrated), bismuth chloride, silver nitrate, ferric sulfate, barium chloride, and the like.

It can be treated with nitrogen base derived compounds such as ammonium sulfate, pyridinium chloride, morpholinium sulfate, hydrazine hydrochloride, phenylhydrazine hydrochloride, benzyltrimethylammonium chloride, tetrabutylammonium chloride, tetramethylammonium chloride, phenyldiazonium chloride, naphthyldiazonium bromide, p-ethoxyphenyldiazonium chloride, phenyldiazonium hydroxide in aqueous alkaline solution, and the like.

It can also be reacted with compounds containing phosphonium cations such as tetramethylphosphonium bromide, methyltriphenylphosphonium bromide, tetrabenzylphosphonium bromide, trimethylsulfonium chloride and the like.

It can also be treated with a combination of a metal chloride and ammonium hydroxide to produce a variety of metal ammine cations. For example, by employing cupric chloride, cobalt chloride, zinc chloride and the like, the corresponding metal ammine cation is obtained.

The above cation exchange reactions may be conducted in aqueous media or non-aqueous media such as methanol, ethanol, dialkyl ethers, dioxane, etc.

In a second procedure, dihydrogen dodecahydrododecaborate ($H_2B_{12}H_{12}$) is reacted with oxides of metals, hydroxides of metals, salts of metals, nitrogen bases and salts thereof. The acid reactant can be prepared by cation exchange of hydrogen cations with the alkali metal or alkaline earth metal cations of the alkali metal or alkaline earth metal dodecahydroborate.

In most instances, the product is obtained as a precipitate due to the lower solubility of the $B_{12}H_{12}{}^{2-}$ anion with the added cation, i.e., the compound $M_a(B_{12}H_{12})_b$ is less soluble than either of the reactants or other products of the cation exchange processes.

The invention is further illustrated by reference to the following examples.

*Example I*

A. A pressure vessel (capacity, 80 ml.) is charged with 1.9 g. (0.05 mole) of sodium hydroborate ($NaBH_4$) and 10 ml. of dry 1,2-dimethoxyethane (glyme). The vessel is closed and it is cooled to −80° C. Pressure in the vessel is then reduced to less than 1 mm. of mercury and 2.0 g. (0.073 mole) of diborane ($B_2H_6$) is charged into the vessel. The vessel is sealed and the reaction mixture is heated with agitation for 10 hours at 60° C. under autogenous pressure.

The vessel is cooled and it is vented to remove volatile material. An amber liquid remains which is held under reduced pressure (less than 1 micron) at the prevailing atmospheric temperature (about 25° C.) until all volatile material is removed. There remains 9.2 g. of oily product which is sodium octahydrotriborate containing glyme.

B. The process of Part A is repeated employing 1.9 g. (0.05 mole) of sodium hydroborate, 2.5 g. (0.09 mole) of diborane and 15 ml. of glyme. The mixture is held at 25° C. under autogenous pressure (about 18 atmospheres gauge) for 10 hours. The volatile products contain 0.04 mole of unreacted diborane and 0.05 mole of hydrogen. The residue is a clear liquid which, following evaporation of the solvent, leaves 6.4 g. of sodium octahydrotriborate containing glyme.

C. A water solution containing 5 g. of tetramethylammonium chloride is added to an aqueous solution of the sodium octahydrotriborate obtained in Part A. A white solid separates which redissolves upon heating the mixture to reflux. The hot solution is mixed with an equal volume of methanol and it is then chilled in an ice bath. Tetramethylammonium octahydrotriborate ($1^-$) separates as white crystals. A total of 4.97 g. of product is obtained from several crystallizations. The identity of the compound, which has the formula $(CH_3)_4NB_3H_8$, is confirmed by the infrared absorption spectrum which is in agreement with data reported for octahydrotriborate ($1^-$) salts.

The oily product obtained initially in the reaction is converted to other metal salts by reaction with the appropriate chloride. To illustrate, a methanol solution containing 0.83 g. of the oily product is mixed with an equal weight of cesium chloride. The mixture is heated to reflux and just enough water is added to form a clear solution. The hot mixture is chilled in an ice bath and dense crystals form which are separated by filtration. The crystals are washed and dried and there is obtained 0.35 g. of cesium octahydrotriborate ($1^-$), i.e., $CsB_3H_8$.

*Analysis.*—Calc'd for $CsB_3H_8$: Cs, 76.60; B, 18.75; H, 4.65. Found: Cs, 71.55; B, 19.05; H, 4.67.

*Example II*

A. A pressure vessel, as described in Example I, is charged with 1.9 g. of sodium hydroborate, 2.8 g. of diborane and 10 ml. of glyme. The mixture is heated with agitation under autogenous pressure at 100° C. for 10 hours. The reaction vessel is cooled and it is vented to remove volatile products. It is noted that these products contain about 0.187 mole of free hydrogen and no diborane. The residue in the reaction vessel consists of a white solid suspended in a yellow liquid. The solid is separated by filtration and washed with glyme. After drying, the solid weighs 3.2 g. and it has the following elemental analysis:

Found: C, 17.07; H, 8.36; B, 40.66; Na, 16.5.

The compound has the identifying infrared absorption spectra of the $B_{12}H_{12}$ anion, i.e., bands at $4.0\mu \pm 0.1$ and $9.35\mu \pm 0.1$, and it is therefore evident that the product on the basis of the infrared absorption spectrum and elemental analysis is disodium dodecahydrododecaborate ($2^-$) with solvent of crystallization, i.e., a compound of the formula $Na_2B_{12}H_{12} \cdot 1.16C_4H_{10}O_2 \cdot 0.36NaBH_4 \cdot H_2O$ whose calculated analysis is: C, 17.20; H, 8.40; B, 41.27; Na, 16.74.

B. The reaction of Part A is repeated. The crude mixture is filtered and the insoluble material is washed with glyme. The filtrate and washings are combined and the combined solutions are evaporated until all solvent is gone. A yellow paste (8.3 g.) remains which is dissolved in water to form a clear solution. Aqueous tetramethylammonium chloride is added to the solution until formation of a white precipitate is complete. The mixture is heated to refluxing and an equal volume of methanol is added. The hot solution is filtered to separate a small quantity (0.4 g.) of insoluble material and the filtrate is chilled in ice water. There is obtained 1.26 g. of tetramethylammonium tetradecahydroundecaborate ($1^-$) as a white crystalline compound which has the following elemental analysis:

Found: C, 22.12; H, 13.06; B, 53.16; N, 7.22, 7.23.

C. The filtrate remaining after isolation of the above compound is evaporated to dryness and the solid residue is crystallized from a minimum quantity of hot water. A white crystalline product (0.31 g.) is obtained which is tetramethylammonium octahydrotriborate ($1^-$), i.e., $(CH_3)_4NB_3H_8$. The identity of the compound is confirmed by its infrared absorption spectrum.

*Example III*

Using the procedure described in Example I, a mixture of 1.9 g. of sodium hydroborate, 10 ml. of dry ethyl ether and 2.7 g. of diborane is heated for 10 hours at 100° C. under autogenous pressure. The volatile products obtained in the reaction contain 0.2 mole of hydrogen and no diborane. A solid product in the reaction vessel is collected, washed thoroughly with dry ether and dried to give 2.68 g. of a white solid. The infrared absorption spectrum of the solid shows that it is a mixture of sodium hydroborate and a disodium polyhydropolyborate ($2^-$). Crystallization of the crude product from a mixture of tetrahydrofuran and glyme yields a disodium polyhydropolyborate ($2^-$) containing 1 mole of glyme and 1 mole of water of crystallization. The compound has the formula $Na_2B_{12}H_{12} \cdot C_4H_{10}O_2 \cdot H_2O$, as shown by the characteristic absorption bands in the infrared absorption spectrum.

*Example IV*

Using the procedure described in Example I, a mixture of 1.9 g. of sodium hydroborate, 2.8 g. of diborane and 10 ml. of dry triethylamine is heated for 10 hours at 120° C. under autogenous pressure. The volatile reaction products contain 0.18 mole of hydrogen. The non-volatile product in the reactor is diluted with ethyl ether and a quantity (2.64 g.) of insoluble material is separated by filtration. The solid is extracted with hot tetrahydrofuran, leaving 0.74 g. of unchanged sodium hydroborate. Glyme is added to the tetrahydrofuran filtrate to form a precipitate which, when separated and purified in the usual manner, yields 2.0 g. of a disodium polyhydropolyborate ($2^-$), which is $Na_2B_{12}H_{12}$.

The filtrate from the ethyl ether solution of the crude reaction product is evaporated to yield 7.0 g. of a crude semi-solid sodium polyhydropolyborate. The compound is sodium tetradecahydroundecaborate ($1^-$) (containing ether of solvation).

Example V

A mixture of 1.9 g. of sodium hydroborate and 2.8 g. of diborane is heated, as described in Example I, for 10 hours at 120° C. under autogenous pressure. A small amount of diborane and 0.145 mole of hydrogen is recovered in the volatile reaction products. A solid which forms in the reaction vessel is removed, washed with ether and dried to give 2.85 g. of material. The solid is extracted with hot tetrahydrofuran, leaving 1.4 g. of sodium hydroborate. The tetrahydrofuran extract is evaporated, leaving 0.21 g. of a disodium polyhydropolyborate, which proves to be disodium dodecahydrododecaborate (2−).

Example VI

A. A pressure vessel of 400 ml. capacity is charged with 9.5 g. of sodium hydroborate and 75 ml. of glyme. The vessel is closed, cooled to −80° C. and evacuated to a pressure of about 0.001 mm. of mercury. Diborane (14.0 g.) is charged into the vessel which is then sealed and heated with agitation under autogenous pressure for 10 hours at 120° C. The molar ratio of $NaBH_4$ to $B_2H_6$ in the reaction is 1:2. The reactor is cooled, the volatile products are released by venting and the contents of the tube are washed into a receiver with glyme. A suspension of a white solid in a yellow liquid is formed from which the solid is separated by filtration. The filtrate from the crude reaction mixture is retained for further work.

The solid is dissolved in hot tetrahydrofuran and the solution is filtered to remove a trace of unreacted sodium hydroborate. The hot filtrate is diluted with glyme and chilled to yield 14.0 g. of disodium dodecahydrododecaborate (2−) as long, glistening white needles. The compound crystallizes with 1,2-dimethoxyethane and water of solvation. The compound has the following infrared absorption frequencies: 2.8μ, sharp, medium; 3.9μ with 4.02μ shoulder, sharp, strong; 6.2, 7.8 and 8.4μ, sharp, medium; 9.3μ, medium sharp, strong; 10.9μ, sharp, strong; and 13.9μ, broad, weak. It has the following elemental analysis:

*Analysis.*—Calc'd for

$$Na_2B_{12}H_{12} \cdot 0.89C_4H_{10}O_2 \cdot 0.56H_2O$$

C, 15.37; H, 7.98; B, 46.67; Na, 16.49. Found: C, 15.52; H, 8.43; B, 47.12; Na, 15.3.

The compound can be obtained as its hydrate by recrystallization from a large quantity of diethyl ether or tetrahydrofuran/diethyl ether mixtures. The ether-free hydrate has the formula $Na_2B_{12}H_{12} \cdot H_2O$ and its infrared absorption characteristics are as follows: 2.8μ, sharp, medium; 3.9μ, sharp, strong; 6.2μ, sharp, medium; 9.25μ, sharp, medium; and 13.9μ, broad, medium.

*Analysis.* — Calc'd for $Na_2B_{12}H_{12} \cdot H_2O$: H, 6.85; B, 63.05; Na, 22.32. Found: H, 6.56; B, 62.02; Na, 20.5.

The glyme filtrate remaining from filtration of the crude reaction mixture is evaporated leaving 7 g. of non-volatile yellow oil which is the crude glyme etherate of sodium tetradecahydroundecaborate (1−).

Crystalline sodium tetradecahydroundecaborate (1−) containing water and dioxane as solvents of crystallization is obtained by dissolving the yellow oil, obtained above, in hot tetrahydrofuran and diluting the hot solution with dioxane. The product has the following infrared absorption characteristics: 4.0μ, sharp, strong; 7.7μ, 7.9μ, sharp, medium; 8.9μ, sharp, strong; 9.25μ, 9.55μ, 11.1μ, sharp, medium; and 11.45μ, sharp, strong. The following analysis is found: C, 27.48; H, 8.57; B, 35.53; Na, 7.40. $NaB_{11}H_{14} \cdot 2C_4H_8O_2 \cdot H_2O$ requires: C, 27.4; H, 9.15; B, 34.0; and Na, 6.56.

B. The procedure of Part A is repeated, employing 9.5 g. of sodium hydroborate and 21.0 g. of diborane. The molar ratio of $NaBH_4$ to $B_2H_6$ is 1:3. There is obtained, by the purification processes described above, 22 g. of disodium dodecahydrododecaborate (2−) and 30 g. of an etherate of sodium tetradecahydroundecaborate (1−). The latter compound yields 19 g. of product on recrystallization as in Section A above.

C. The procedure of Part A is repeated, employing 9.5 g. of sodium hydroborate and 26.0 g. of diborane. The molar ratio of $NaBH_4$ to $B_2H_6$ is about 1:4. There is obtained 10 g. of disodium dodecahydrododecaborate (2−) and 60 g. of an etherate of sodium tetradecahydroundecaborate (1−). The latter compound yields 30 g. of highly purified product on recrystallization.

Example VII

Using the procedure of Example I, a mixture of 1.9 g. of sodium hydroborate, 2.8 g. of diborane and 15 ml. of benzene is heated for 10 hours at 120° C. under autogenous pressure. The volatile reaction product contains 0.19 mole of hydrogen and no diborane. The vessel contains a yellow solid suspended in a clear liquid. The solid is removed by filtration and washed with glyme. The infrared absorption spectrum of the solid shows that it is principally disodium dodecahydrodecaborate (2−) with a minor quantity of unchanged sodium hydroborate.

Example VIII

Using the procedure of Example I, a mixture of 2.8 g. of potassium hydroborate, 2.8 g. of diborane and 15 ml. of glyme is heated for 10 hours at 120° C. under autogenous pressure. A total of 0.281 mole of hydrogen is formed. The yellow solid in the reaction vessel is collected on a filter and it is washed with glyme until it is colorless. The solid is dried under very low pressure (less than 1 mm. of mercury) at 90° C. to yield 3.93 g. of dipotassium dodecahydrododecaborate (2−) ($K_2B_{12}H_{12}$).

One-half of the above solid product is dissolved in water and aqueous tetramethylammonium chloride is added to the solution. A white solid separates which dissolves incompletely when the solution is heated to boiling. The solution is filtered and the filtrate is chilled to precipitate bis(tetramethylammonium) dodecahydrododecaborate (2−). There is obtained 0.38 g. of the product which has the formula $[(CH_3)_4N]_2B_{12}H_{12}$.

Example IX

A pressure vessel (capacity, 80 ml.) is charged with 0.76 g. of sodium hydroborate and 15 ml. of tri(n-butyl) phosphine. The vessel is closed and cooled to about −80° C. by immersion in a solid carbon dioxide-acetone bath. Pressure in the vessel is reduced to a very low value (0.1 mm. or less) by means of a vacuum pump. Diborane (3.1 g.) is injected into the vessel which is then closed. The reaction mixture is heated with agitation under autogenous pressure for 10 hours at 120° C. The reaction vessel is cooled and volatile gases are removed by venting. The gases contain 0.19 mole of hydrogen. A white solid suspended in a yellow liquid remains in the reaction vessel. The mixture is filtered to separate the white solid which is washed with glyme and dried at low pressure (0.001 mm. or less) at 90–100° C. There is obtained 1.61 g. of $Na_2B_{12}H_{12}$, containing glyme of solvation. The identity of the product is confirmed by the infrared absorption spectrum.

Example X

A pressure vessel (capacity, 400 ml.) is charged with 19.0 g. of sodium hydroborate and 75 ml. of dry triethylamine. The vessel is cooled in a solid carbon dioxide-acetone bath and the internal pressure is reduced to less than 0.1 mm. pressure by means of a vacuum pump. Diborane (36.0 g.) is introduced into the vessel which is then closed. The mixture is heated with agitation for 10 hours at 180° C. After cooling the vessel and venting to remove volatile products, there remains a solid residue which is washed from the vessel with glyme. The solid is separated by filtration and it is again washed with glyme. The washed solid is dissolved in hot tetrahydrofuran and the solution is filtered to remove a small quantity of insoluble product. The filtrate is heated to boiling and glyme is added slowly until solid material begins to separate. The mixture is chilled and it is then filtered to separate the white crystals. These crystals are washed with glyme and dried at less than 0.001 mm. pressure at 90–100° C. to yield 43.9 g. of $Na_2B_{12}H_{12}$ containing glyme and water of solvation. Further treatment of the filtrate yields an additional 5.4 g. of the product.

*Example XI*

A pressure vessel (80 ml. capacity) is charged, as described in Example IX, with 0.76 g. of sodium hydroborate, 15 ml. of dimethyl sulfide and 3.3 g. of diborane. The mixture is heated at 120° C. for 10 hours with agitation and the volatile products are removed as described in Example IX. The volatile products contain 0.123 mole of hydrogen. Dimethyl sulfide is removed from the residue in the reaction vessel by distillation and there remains a white solid which is recrystallized from a tetrahydrofuran/glyme mixture. After drying, the product, which is $Na_2B_{12}H_{12}$ containing glyme and water of solvation, weighs 1.57 g.

In the operation of the process at 100° C. or higher, precursors of the alkali metal hydroborate can be employed, e.g., an alkali metal and diborane, in place of the alkali metal hydroborate. This mode of operation is illustrated in Example XII.

*Example XII*

Using the procedure of Example I, a mixture of 1.07 g. of metallic sodium, 2.5 g. of diborane and 10 ml. of glyme is heated under autogenous pressure for 10 hours at 100° C. The volatile products obtained on venting the reactor contain 0.12 mole of hydrogen. The reaction vessel contains 1.72 g. of white solid and approximately 0.9 g. of unreacted sodium metal. A portion (0.5 g.) of the white solid, which is shown by infrared spectrographic analysis to contain disodium dodecahydrododecaborate (2−) is dissolved in water and the solution is treated with excess aqueous tetramethylammonium chloride. There is obtained 0.2 g. of bis(tetramethylammonium) dodecahydrododecaborate (2−). The compound has the formula $[(CH_3)_4N]_2B_{12}H_{12}$.

Other precursors for alkali metal hydroborates which may be employed are alkali metal hydrides and diborane or a combination of an alkali metal, hydrogen and diborane.

In each of the foregoing examples, the reaction of the alkali metal or alkali metal hydroborate with diborane is conducted under superatmospheric pressure. Reaction of sodium hydroborate and diborane at atmospheric pressure and room temperatures does not yield the desired polyhydropolyborates. To illustrate, a vessel is charged with 0.95 g. of sodium hydroborate and 15 ml. of dry glyme. The charged vessel is evacuated to about 50 mm. pressure and sufficient diborane (0.8 g.) is added to bring the pressure in the vessel to 1 atmosphere (15 lbs./sq. in. absolute) at the prevailing temperature, i.e., about 25° C. The vessel is closed, placed on a mechanical shaker and agitated at 25° C. for about 4.0 hours. The internal pressure remains unchanged at 1 atmosphere. All of the diborane is recovered unchanged and no hydrogen attributable to the reaction of diborane with sodium hydroborate is found. The process is repeated, charging sufficient diborane (2.3 g.) into the vessel until a pressure of 3 atmospheres (absolute) is reached. After shaking the mixture for 4 hours at 25° C., an increase in pressure is observed on the gauge. Hydrogen is found in the volatile reaction products and only 2.1 g. of diborane is recovered. Sodium octahydrotriborate (1.0 g.) is isolated from the solid reaction products.

From the foregoing data, it is evident that an essential feature of the process is the use of a pressure of at least about 3 atmospheres, i.e., 45 lb./sq. in. absolute, in the process to obtain totally unexpected results. At higher pressures, e.g., 5 atmospheres or higher, the reaction proceeds rapidly and good yields of desired products are obtained.

Pressures above atmospheric can be obtained by any suitable means. Inert gases, e.g., nitrogen, argon, helium, saturated hydrocarbons, and the like, can be charged into the reaction vessel with diborane to provide the pressure under the reaction conditions. Diborane can be used in excess, as illustrated in the examples, to provide a convenient way of obtaining superatmospheric pressure.

It is not essential that a solvent be employed in the process. However, in the event a solvent is employed, care should be exercised in the choice. To illustrate, glyme (1,2-dimethoxyethane) in the presence of sodium hydroborate and diborane is unreactive, and it is a preferred solvent. However, glyme and diborane in the absence of sodium hydroborate react at 100° C. with cleavage of the glyme. Similarly, at low temperatures, i.e., at less than about 80° C., diethyl ether is a satisfactory solvent but at higher temperatures, generally above 100° C., it shows some cleavage. It is preferable, therefore, to employ the higher boiling solvents at temperatures above 100° C.

Examples I–XII illustrate the process of the invention for preparing polyhydropolyborates of the scope represented by Formula 2. Thus, there can be obtained polyborates which have a minimum of three boron atoms and which can have a much higher number of boron atoms, e.g., 11 or 12.

*Example XIII*

To the glyme filtrate, obtained in Example VI, Part A, by filtration of the crude reaction mixture, sufficient dioxane is added to precipitate a white solid. The solid is separated by filtration, washed with dioxane and dried to yield 20.1 g. of $NaB_{11}H_{14}$ containing dioxane and water of crystallization; it is dissolved in 100 ml. of water and the solution is steam-distilled for 30 minutes. The solution is then evaporated to yield a sticky white solid. The solid is dissolved in 75 ml. of water and 12 ml. of 50% aqueous cesium fluoride solution is added with stirring. A white precipitate forms which dissolves on warming. The solution is cooled to yield white needles which are separated by filtration and dried at 25° C. under 0.02 mm. pressure. There is obtained 10.0 g. of white crystalline cesium tetradecahydroundecaborate (1−) whose infrared spectrum shows no absorption bands assignable to water, dioxane or 1,2-dimethoxyethane (glyme), i.e., the product is free of solvents of crystallization. The infrared absorption spectrum shows bands at 3.9–4.0μ (characteristic for the B-H band (and 9.6μ and 9.9μ (both characteristic for the boron skeletal absorption of $B_{11}H_{14}^-$).

A portion (2.0 g.) of the above product is recrystallized from 25 ml. of water to form fine white crystals which are dried at 65° C. under 0.02 mm. pressure for 5 hours. The infrared absorption spectrum of this product is unchanged from the spectrum described above. The density of the crystals is 1.66. The composition and properties of the product show that it contains cesium.

*Analysis.*—Found: Cs, 50.3; B, 44.61; H, 5.53; M.W., 265 ±10. Calc'd for $CsB_{11}H_{14}$: Cs, 50.0; B, 44.8; H, 5.3; M.W. 266.

The complete X-ray powder diffraction data are as follows: 7.36 ($M_4$), 6.43 (F), 6.14 (V), 5.64 ($M_2$), 5.57 ($M_2$), 5.16 ($M_4$), 4.84 ($M_3$), 4.47 ($M_1$), 4.22 (S), 3.66 ($M_2$), 3.49 (F), 3.37 ($M_4$), 3.34 (F), 3.21 (V), 3.06 (F), 2.99 (V), 2.96 (F), 2.78 ($M_4$), 2.62 (F), 2.57 ($M_2$), 2.43 (F), and 2.35 ($M_4$). The letters indicate intensity of lines in decreasing order as follows: S=strong; $M_1$, $M_2$, $M_3$, $M_4$=medium (decreasing); F=faint; V=very faint, and the numbers indicating the positions of the *d* lines are in Angstroms.

The cesium tetradecahydroundecaborate, obtained above, is further characterized by differential thermal analysis as follows: A 50 mg. sample of the cesium salt is heated in a 3 mm. quartz tube at a rate of 7.5° C./min., as measured by a "Chromel"-"Alumel" differential thermocouple. A strong *irreversible* exothermic transition is noted at 212° C. ±1° C. No further significant change is noted until a temperature of 676° C. is reached, at which temperature a prolonged endothermic transition takes place. When the temperature reaches 880° C., the test is stopped and it is noted that the sample is converted to ash. In contrast $Cs_2B_{12}H_{12}$ (in this test) exhibits no significant transitions up to about 734° C. whereupon a slow endothermic change sets in.

Cesium tetradecahydroundecaborate (1−), obtained above, will undergo deuterium exchange, a property which is not shown by dicesium dodecahydrododecaborate (2−). Thus, 0.33 g. of the cesium salt, obtained as described above, is dissolved in 4.0 ml. of boiling deuterium oxide and the solution is cooled to precipitate a white crystalline product. The crystals are separated by filtration and dried at 65° C. under 0.02 mm. pressure for 2 hours. The infrared absorption spectrum of the product is the same as described earlier for the $B_{11}H_{14}^-$ anion with the addition of a week band at 5.3μ (characteristic for B-D stretching) and the disappearance of the weaker band at 9.9μ (characteristic of the boron skeletal absorption). $Cs_2B_{12}H_{12}$, treated as described above, showed no evidence of exchange of hydrogen and deuterium.

*Example XIV*

(A) An aqueous solution containing 0.3 g. of disodium dodecahyrododecaborate is mixed with an aqueous solution containing an equal weight of tetramethylammonium chloride. A white precipitate forms immediately. The mixture is heated to boiling and sufficient methanol is added to form a clear solution. The solution is chilled and white crystals form which are separated by filtration, washed and dried at very low pressure at 90° C. There is obtained 0.14 g. of bis(tetramethylammonium) dodecahydrododecaborate (2−).

*Analysis.*—Calc'd for $[(CH_3)_4N]_2B_{12}H_{12}$: C, 33.11; H, 12.5; B, 44.74; N, 9.65. Found: C, 30.80; H, 11.77; B, 46.61; N, 9.16, 8.88.

The infrared absorption spectrum of the compound is as follows, using a "Nujol" mull: 3.95μ, sharp, strong; fine structure at 4.9–6.5μ, weak; 7.8μ, sharp, medium; 9.4μ, sharp, strong; and [for the $(CH_3)_4N^+$ cation], 10.5μ, sharp, strong.

The compound can be purified by recrystallization from water to yield the monohydrate.

*Analysis.*—Calc'd for $[(CH_3)_4N]_2B_{12}H_{12} \cdot H_2O$: C, 31.13; H, 12.41; B, 42.07; N, 9.08. Found: C, 30.95; H, 11.48; B, 42.68; N, 8.80, 8.91.

(B) An aqueous solution containing 025 g. of disodium dodecahydrododecaborate (2−) is treated with an aqueous solution containing 0.25 g. of cesium chloride. A white precipitate forms which redissolve when the mixture is heated to boiling. Upon chilling, dense white crystals are precipitated which are a mixture of dicesium dodecahydrododecaborate (2−) and cesium chloride. The crystals are separated and dried at 90° C. under reduced pressure (less than 1 mm. of mercury), to obtain 0.31 g. of white crystals. The product can be further purified by recrystallization from water and it has the composition: $Cs_2B_{12}H_{12} \cdot CsCl \cdot H_2O$.

*Analysis.*—Cal'd for $Cs_3B_{12}H_{14}ClO$: Cs, 67.11; H, 2.37; B, 21.85; Cl, 5.96. Found: Cs, 66.2; H, 2.21; B, 22.14; Cl, 6.33.

The infrared absorption spectrum of a "Nujol" mull of the compound shows the following absorption bands: 3.9μ, 4.1μ, doublet, sharp, strong; 9.25μ, sharp, strong; 9.45μ, sharp, medium; 13.75μ, sharp, medium; 14.05μ, sharp, medium.

*Example XV*

An aqueous solution of 3.2 g. of $Na_2B_{12}H_{12}$ is mixed with an aqueous solution of 12 g. of cesium fluoride. A heavy white precipitate forms which dissolves on warming the reaction mixture. On cooling, fine white crystals form which are separated by filtration and dried. Ther is obtained 3.2 g. cesium dodecahydrododecaborate (2− with solvent (glyme) of crystallization.

*Example XVI*

A solution of 0.89 g. of P,P,P,P',P',P'-(hexamethyl ethylenediphosphonium bromide in 5 ml. of water i added with stirring to a solution of 1.13 g. of cesium do decahydrododecaborate in 100 ml. of water. A voluminou: white precipitate forms. The mixture is boiled to dissolve most of the precipitate. Cooling of the hot solution re sults in precipitation of a white solid which is separatec by filtration. The solid is recrystallized from 1 liter oi water to form soft white needles. The product is P,P,P, P',P',P' - (hexamethyl)ethylenediphosphonium dodecahy· drododecaborate (2−), i.e., $$[(CH_3)_3PCH_2CH_2P(CH_3)_3]B_{12}H_{12}$$

The identity of the compound is confirmed by the infrared spectrum and by elemental analysis. The product, as obtained, is free of water of hydration.

*Analysis.*—Calc'd for $C_8H_{34}B_{12}P_2$: C, 29.83; H, 10.64; B, 40.29; P, 19.24. Found: C, 29.89; H, 10.94; B, 39.86; P, 19.31.

*Example XVII*

(A) An aqueous solution containing 0.01 mole of $Na_2B_{12}H_{12}$ is added with stirring to 13 ml. of an aqueous solution containing 2.2 g. of $ZnCl_2$ and 7 ml. of concentrated aqueous $NH_4OH$. A white solid product precipitates and it is separated by filtration. The solid product is dissolved in about 700 ml. of hot aqueous ammonia (4 parts of water and 1 part of concentrated $NH_4OH$) and the solution is chilled. The product crystallizes as glistening white plates which are separated by filtration and dried under reduced pressure (less than 0.01 mm. of mercury) at 90° C. to yield 2.2 g. of the ammonia complex of zinc dodecahydrododecaborate having the structure $Zn(NH_3)_4B_{12}H_{12}$, which can be called tetraaminezinc (II) dodecahydrododecaborate (2−). The infrared absorption spectrum shows absorption bands at 4.05μ and 9.45μ, characteristic for the $B_{12}H_{12}$ anion, and it also shows N-H absorption bands for the bound $NH_3$ molecules.

*Analysis.*—Calc'd for $[Zn(NH_3)_4]B_{12}H_{12}$: Zn, 23.65; N, 20.4; B, 47.2; H, 8.78. Found: Zn, 23.60; N, 19.55; B, 45.8; H, 8.57.

(B) Using the procedure of Part A, a small quantity of disodium dodecahydrododecaborate is treated with ammoniacal nickel (II) chloride. A lavender-colored solid product precipitates and it is separated by filtration. The product is recrystallized from hot aqueous ammonia solution to form lavender crystals which are dried at 90° C. under very low pressure (less than 0.01 mm. of mercury). The product is hexaamminenickel (II) dodecahydrododecaborate (2−), i.e., a compound of the formula $$Ni(NH_3)_6B_{12}H_{12}$$

The compound, as obtained under the above conditions of drying, contains 0.5 mole of water of crystallization. The infrared absorption spectrum of the compound shows absorption bands at 4.02μ and 9.44μ, which are characteristic for the $B_{12}H_{12}$ anion, as well as other bands at wave lengths which are characteristic for the hexaamminenickel cation.

*Analysis.*—Calc'd for $Ni(NH_3)_6B_{12}H_{12} \cdot \frac{1}{2}H_2O$: Ni, 18.61; N, 26.95; B, 41.6. Found: Ni, 18.81; N, 26.86; B, 41.6.

*Example XVIII*

An aqueous solution of 4.4 g. of p-methoxybenzenediazonium tetrafluoroborate in 50 ml. of water is filtered to remove insoluble material. The filtrate is cooled in an ice bath and an aqueous solution containing 1.0 g. of the monohydrate of disodium dodecahydrododecaborate ($Na_2B_{12}H_{12} \cdot H_2O$) is added to the filtrate with stirring. A heavy white precipitate forms which is separated by filtration. The solid product is dried in air and its infrared absorption spectrum shows bands at $4.0\mu$ and $9.4\mu$, characteristic for the B-H and $B_{12}$ skeleton structures. The spectrum also shows bands at $4.4\mu$ (for the diazonium structure) and $6.3\mu$, $9.1\mu$ and $11.9\mu$ (for the aromatic ring structure). The product is p-methoxybenzenediazonium dodecahydrododecaborate (2−), i.e., $[p-CH_3—C_6H_4—N_2]_2B_{12}H_{12}$.

The identity of the compound is confirmed by elemental analysis of a portion of the product which is dried at 25° C. and 0.02 mm. pressure for 20 hours. The dried product is shock sensitive and it detonates with a flash of light and evolution of much black ash when placed on a metal block and struck with a hammer. It also detonates in the combustion chamber employed for analysis but, despite this behavior, analytical data conform reasonably well with theoretical values.

*Analysis.*—Calc'd for $C_{14}H_{26}B_{12}N_4O_2$: C, 40.74; H, 6.36. Found: C, 38.86; H, 6.26.

The diazonium salt of Example XVIII reacts with potassium phenoxide in ethanol solution to form a solution of intense yellow color, characteristic of an aromatic diazonium salt.

A further characteristic reaction of the diazonium salt of Example XVIII is its rearrangeemnt in refluxing ethanol solution to a hydrate of the acid of an arylazosubstituted polyhydrododecaborate, i.e., a compound of the formula $(H_3O)_2B_{12}H_{10}(N_2C_6H_4OCH_3)_2$. This compound dissolves in ethanol to form a solution of violet color. Evaporation of the solvent leaves a tacky purple solid. This product is useful as a dye for fabrics.

By using the processes illustrated in Examples XIV, XV and XVI, sodium or potassium dodecahydrodecaborate can be reacted with rubidium chloride to yield $Rb_2B_{12}H_{12}$; with strontium chloride to yield $SrB_{12}H_{12}$; with tantalum chloride to yield $Ta(B_{12}H_{12})_2$; with chromium sulfate to yield $Cr_2(B_{12}H_{12})_3$; with manganous acetate to yield $MnB_{12}H_{12}$; with cupric chloride to yield $CuB_{12}H_{12}$; with cuprous chloride to yield $Cu_2B_{12}H_{12}$; with zinc bromide to yield $ZnB_{12}H_{12}$; with cadmium chloride to yield $CdB_{12}H_{12}$; with aluminum chloride (hydrated) to yield $Al_2(B_{12}H_{12})_3$; with stannic chloride (hydrated) to yield $Sn(B_{12}H_{12})_2$; with bismuth chloride to yield $Bi_2(B_{12}H_{12})_3$; with benzyltrimethylammonium chloride to yield $$[(C_6H_5CH_2)(CH_3)_3N]_2B_{12}H_{12}$$

with tetrabutylammonium chloride to yield $$[(C_4H_9)_4N]_2B_{12}H_{12}$$

with tetramethylphosphonium bromide to yield $$[(CH_3)_4P]_2B_{12}H_{12}$$

with methyltriphenylphosphonium bromide to yield $$[CH_3(C_6H_5)_3P]_2B_{12}H_{12}$$

and with tetrabenzylphosphonium bromide to yield $$[C_6H_5CH_2)_4P]_2 \cdot B_{12}H_{12}$$

The reaction can be conducted in nonaqueous solvents, for example, methanol, ethanol, ether and the like, if desired.

By using the process of Example XVII with the appropriate metal halide there can be obtained a wide variety of metal ammine dodecahydrododecaborates, e.g., with cobalt chloride, $[Co(NH_3)_6]B_{12}H_{12}$ is obtained; with copper chloride, $[Cu(NH_3)_4]B_{12}H_{12}$ is obtained.

By using the process illustrated in Example XVIII with the appropriate aryldiazonium halide, a broad range of diazonium salts are obtained, e.g., with phenyldiazonium chloride, there is obtained $(C_6H_5N_2)_2B_{12}H_{12}$, with naphthyldiazonium bromide, $(C_{10}H_7N_2)_2B_{12}H_{12}$ is obtained; and with p-ethoxyphenyldiazonium chloride, $$(C_2H_5OC_6H_4N_2)_2B_{12}H_{12}$$

is obtained.

*Example XIX*

(A) An aqueous solution containing 0.43 g. of disodium dodecahydrododecaborate (2−), obtained by the process described in Example III, is passed through a 0.5″ diameter chromatography column containing 80 ml. of the ion exchange resin known commercially as "Amberlite" IR–120–H, acid form. The strongly acid effluent from the column is evaporated to remove all materials volatile at less than 0.001 mm. at 45° C. There remains 0.38 g. of a very white, crystalline, very hydroscopic solid which is dihydrogen dodecahydrododecaborate (2−). The acid has a $pK_a$ value at 25° C. of about 2.0 and it titrates as a very strong acid, having an equivalence point at a pH of 7. The infrared absorption spectrum of the acid, which has the formula $H_2B_{12}H_{12}$, shows strong absorption at $3.98\mu$ and $9.3\mu$.

(B) An aqueous solution of the free acid ($H_2B_{12}H_{12}$) obtained from $Na_2B_{12}H_{12}$ is neutralized by treatment with cesium hydroxide. A white solid precipitates which is separated by filtration and dried as described above. The product, which is $Cs_2B_{12}H_{12}$, dicesium dodecahydrododecaborate (2−) is sparingly soluble in water and it is characterized by the following infrared absorption bands: $3.94\mu$, $9.35\mu$, sharp, strong; $14.0\mu$, sharp, medium; $13.3\mu$, medium broad, weak.

*Analysis.*—Calc'd for $Cs_2B_{12}H_{12}$: Cs, 65.18; B, 31.84; H, 2.97. Found: Cs, 62.7; B, 30.91, 31.08; H, 3.17.

(C) An aqueous solution of the acid, $H_2B_{12}H_{12}$, is neutralized with an aqueous solution of barium hydroxide. The clear neutralized solution is evaporated to dryness under reduced pressure to obtain barium dodecahydrododecarborate as a white crystalline residue. The product which has the formula $BaB_{12}H_{12}$ [barium dodecahydrododecaborate (2−)], is very soluble in water and ethyl alcohol. The infrared absorption spectrum of the compound shows bands at $4.03\mu$ and $9.34\mu$ which are within the range of characterizing absorption bands for the $B_{12}H_{12}$ anion.

*Analysis.*—Calc'd for $BaB_{12}H_{12} \cdot \frac{1}{3}C_2H_5OH \cdot 1\frac{2}{3}H_2O$: Ba, 42.30; B, 39.99; H, 5.37; C, 2.46. Found: Ba, 42.16; B, 39.61; H, 5.41; C, 2.37.

An aqueous solution of the acid, upon treatment with tetramethylammonium chloride or tetramethylammonium hydroxide yields $[CCH_3)_4N]_2B_{12}H_{12}$. In like manner, reaction of the acid with aqueous hydrazine yields $$(NH_2NH_3)_2B_{12}H_{12}$$

with phenylhydrazine, $(C_6H_5NHNH_3)_2B_{12}H_{12}$; with morpholine, $$(CH_2CH_2OCH_2CH_2NH_2)_2B_{12}H_{12}$$

with ferrous sulfate, $FeB_{12}H_{12}$, with calcium hydroxide, $CaB_{12}H_{12}$; with cobalt chloride, $Co(B_{12}H_{12})$; with mercuric nitrate, $HgB_{12}H_{12}$; with bismuth chloride, $$Bi_2(B_{12}H_{12})_3$$

with magnesium chloride, $MgB_{12}H_{12}$; with pyridine $$(C_5H_5NH)_2B_{12}H_{12}$$

with ammonia, $(NH_4)_2B_{12}H_{12}$; with ethylamine, $$(C_2H_5NH_3)_2B_{12}H_{12}$$

with trioctylamine, $[(C_8H_{17})_3NH]_2B_{12}H_{12}$; with ω-aminocapronitrile, $[CH(CH_2)_5NH_3]_2B_{12}H_{12}$; with cyclohexylamine, $(C_6H_{11}NH_3)_2B_{12}H_{12}$; with diphenylamine, $$[(C_6H_5)_2NH_2]_2B_{12}H_{12}$$

and with p-aminobenzoic acid, $(HOOCC_6H_4NH_3)_2B_{12}H_{12}$.

Salts of the $B_{12}H_{12}^{2-}$ anion can be prepared by neutralization of the acid, such as the acid of Example XIX, in aqueous or alcohol solution to obtain compounds having a broad range of cations. For example, carbonates, oxides and hydroxides of metals and nitrogen bases can be used to prepare salts.

The products obtained by the process of this invention are useful as sequestering agents for metals, especially heavy metals.

To illustrate, a mixture of hydrocarbons in the boiling range of gasoline, which contains in solution a copper salt of an organic acid (copper stearate), is thoroughly agitated with an aqueous ammoniacal solution of $Na_2B_{12}H_{12}$ or $NaB_{11}H_{14}$. The hydrocarbon layer, which is separated from the aqueous reagent, is completely free of the deleterious copper salt. Copper is also removed from aqueous solutions of salts containing the metal by mixing the solutions with an ammoniacal solution of an alkali metal or alkaline earth metal salt of a dodecahydrododecaborate or tetradecahydroundecaborate.

The foregoing detailed description has been given for clearness of undesrtanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. The process for making compounds of the formula $$M'_{a'}(B_nH_m)_{b'}$$

wherein M' is a cation selected from the group consisting of alkali metals and alkaline earth metals, $(B_nH_m)$ is an anion of valence 1-2, inclusive; $a'$ and $b'$ are positive whole numbers whose values are determined by the equation $$b' = \frac{a' \times \text{valence of } M'}{\text{valence of } (B_nH_m)}$$

$n$ is an integer of at least 3, $m$ is an integer greater than 3 and is at least equal to $n$, and the sum of $m$, $n$, and the valence of $(B_nH_m)$ is a positive even number, which comprises contacting, under a pressure of at least 3 atmospheres and in the substantial absence of air and water, diborane with a compound of the formula $M'(BH_4)_x$ wherein M' is as defined above and $x$ is a positive whole number less than 3 and is determined by the valence of M'.

2. The process of claim 1 wherein M' is an alkali metal cation.

3. The process of claim 1 wherein $(B_nH_m)$ is $$(B_{12}H_{12})=$$

4. The process of claim 1 wherein $(B_nH_m)$ is $$(B_{11}H_{14})-$$

5. The process of claim 1 wherein $(B_nH_m)$ is $(B_3H_8)^-$.

6. The process of claim 1 wherein $n$ is greater than 10 and the reaction is carried out at a temperature of at least about 100° C.

7. The process of claim 1 wherein M' is sodium, $(B_nH_m)$ is $(B_{12}H_{12})$, $a'$ is 2, $b'$ is 1, $x$ is 1 and the reaction is carried out at a temperature of at least about 100° C.

8. The process for preparing compounds of the formula $$M_a(B_{12}H_{12})_b$$

wherein $a$ and $b$ are positive whole numbers of 1 through 3 whose respective values are determined by the valence of M according to the formula $$b = \frac{a \times \text{valence of } M}{2}$$

and M is a cation of atomic weight of at least 5 and a valence of 1-4, inclusive which comprises contacting a compound of the formula $$M'_{a'}(B_{12}H_{12})_{b'}$$

wherein M' is a cation of the group consisting of alkali metals and alkaline earth metals, $a'$ and $b'$ are positive whole numbers determined by the equation $$b' = \frac{a' \times \text{valence of } M'}{2}$$

with a reactant having the cation M, and recovering the product $M_a(B_{12}H_{12})_b$.

9. The process for preparing compounds of the formula $$M_a(B_{12}H_{12})_b$$

wherein $a$ and $b$ are positive whole numbers of 1 through 3 whose respective values are determined by the valence of M according to the formula $$b = \frac{a \times \text{valence of } M}{2}$$

and M is a cation selected from the group consisting of metals selected from the groups of the Periodic Table consisting of I-B, II-B, III-B, IV-B, V-B, VI-B, VI-A, VIII, III-A having an atomic number greater than 5, IV-A having an atomic number greater than 14, V-A having an atomic number greater than 33, and VI-A having an atomic number greater than 52;

$RNH_3^+$, $R_2NH_2^+$, $R_3NH^+$, $R_4N^+$, $ArN=N^+$, $R_4P^+$, $R_3P^+R'P^+R_3$, $R_3S^+$ wherein R is alkyl of up to 18 carbon atoms, Ar is aryl of up to 18 carbon atoms, and R' is divalent alkylene of up to 6 carbon atoms, and $(NH_3)_cY$ wherein Y is of the group consisting of cobalt, nickel, copper, zinc, cadmium, mercury and silver, and $c$ is a positive whole number of at most 6, which comprises contacting a compound of the formula $$H_2B_{12}H_{12}$$

in solution with a reactant having the cation M, and recovering the product $M_a(B_{12}H_{12})_b$.

10. The process of claim 1 wherein the reaction temperature is between 0° and 200° C.

11. The process of claim 3 wherein the reaction temperature is between 100° and 200° C.

12. The process of claim 4 wherein the reaction temperature is between 100° and 200° C.

13. The process of claim 5 wherein the reaction temperature is between 20° and 80° C.

No references cited.

OSCAR R. VERTIZ, *Primary Examiner.*

MILTON WEISSMAN, *Assistant Examiner.*

UNITED STATES PATENT OFFICE
CERTIFICATE OF CORRECTION

Patent No. 3,328,134                        June 27, 1967

Henry C. Miller et al.

It is hereby certified that error appears in the above numbered patent requiring correction and that the said Letters Patent should read as corrected below.

Column 2, line 50, for "$(_{11}H_{14})_x$" read -- $(B_{11}H_{14})_x$ --; column 15, line 28, for "rearrangeemnt" read -- rearrangement --; column 16, line 49, for "$[CCH_3)_4N]$" read -- $[(CH_3)_4N]$ --; line 69, for "$[CH(CH_2)_5$" read -- $(CN(CH_2)_5$ --.

Signed and sealed this 25th day of June 1968.

(SEAL)
Attest:

Edward M. Fletcher, Jr.
Attesting Officer

EDWARD J. BRENNER
Commissioner of Patents